United States Patent
Cho et al.

(10) Patent No.: US 9,549,108 B2
(45) Date of Patent: Jan. 17, 2017

(54) PHOTOGRAPHIC LENS OPTICAL SYSTEM

(71) Applicant: KOLEN CO., LTD., Seongnam-si (KR)

(72) Inventors: Jae Hoon Cho, Seongnam-si (KR); Chi Ho Ahn, Seongnam-si (KR); Ji Eun Kim, Seongnam-si (KR); Se Jin Kim, Seoul (KR); Seong Hee Bae, Daejeon (KR)

(73) Assignee: KOLEN CO., LTD (KR)

( * ) Notice: Subject to any disclaimer, the term of this patent is extended or adjusted under 35 U.S.C. 154(b) by 92 days.

(21) Appl. No.: 14/587,887

(22) Filed: Dec. 31, 2014

(65) Prior Publication Data

US 2015/0185447 A1 Jul. 2, 2015

(30) Foreign Application Priority Data

Dec. 31, 2013 (KR) .......................... 10-2013-0169341

(51) Int. Cl.
 *G02B 3/02* (2006.01)
 *H04N 5/225* (2006.01)
 *G02B 13/00* (2006.01)

(52) U.S. Cl.
 CPC ........ *H04N 5/2254* (2013.01); *G02B 13/0045* (2013.01)

(58) Field of Classification Search
 CPC ................................................. G02B 13/0045
 USPC .......................................................... 359/714
 See application file for complete search history.

(56) References Cited

U.S. PATENT DOCUMENTS

| | | | |
|---|---|---|---|
| 9,036,276 B2 | 5/2015 | Liou et al. |
| 2005/0152048 A1 | 7/2005 | Nishina |
| 2007/0229984 A1 | 10/2007 | Shinohara |
| 2013/0003195 A1 | 1/2013 | Kubota et al. |

(Continued)

FOREIGN PATENT DOCUMENTS

| | | |
|---|---|---|
| CN | 102967920 A | 3/2013 |
| CN | 103293638 A | 9/2013 |

(Continued)

OTHER PUBLICATIONS

Korean Intellectual Property Office—Notice of Non-Final Rejection Application No. 10-2013-0169341 Issued: Oct. 31, 2014 pp. 7.

(Continued)

*Primary Examiner* — James Jones
(74) *Attorney, Agent, or Firm* — St. Onge Steward Johnston & Reens, LLC

(57) ABSTRACT

A photographic lens optical system which includes five lenses sequentially arranged in a direction from an object to an image sensor is disclosed. A first lens may have a positive refractive power and an entrance surface convex toward the object. A second lens may have a negative refractive power and an exit surface concave toward the image sensor. A third lens may have a positive refractive power and a meniscus shape convex toward the image sensor. A fourth lens may have a negative refractive power and a meniscus shape convex toward the image sensor. A fifth lens may have a negative refractive power, and at least one of an entrance surface and an exit surface of the fifth lens may be aspheric. The system may satisfy the formula: | tan θ|/f<1.0, θ denoting an angle of view of the system, and f denoting a focal length of the system.

16 Claims, 6 Drawing Sheets

(56) References Cited

U.S. PATENT DOCUMENTS

| | | | |
|---|---|---|---|
| 2013/0057973 A1* | 3/2013 | Kubota | G02B 13/0045 |
| | | | 359/764 |
| 2013/0235474 A1 | 9/2013 | Tsai et al. | |
| 2015/0370047 A1 | 12/2015 | Kubota et al. | |

FOREIGN PATENT DOCUMENTS

| CN | 103309015 A | 9/2013 |
|---|---|---|
| CN | 203365784 U | 12/2013 |
| JP | 2003011710 A | 1/2003 |
| JP | 2008250331 A | 10/2008 |
| JP | 2011085733 A | 4/2011 |
| JP | 4847172 B2 | 12/2011 |
| JP | 5368612 B2 | 12/2013 |

OTHER PUBLICATIONS

Korean Intellectual Property Office Notice of Non-Final Rejection Application No. 10-2013-0169341 Date: Dec. 31, 2015 Pages.

* cited by examiner

PHOTOGRAPHIC LENS OPTICAL SYSTEM

FIELD OF THE INVENTION

One or more embodiments of the present invention relate to an optical device, and more particularly, to a lens optical system for cameras.

BACKGROUND OF THE INVENTION

Recently, the use of cameras including solid-state imaging devices such as charge coupled devices (CCDs) or complementary metal oxide semiconductor (CMOS) image sensors has greatly increased (hereinafter, cameras including solid-state imaging devices will be simply referred to as cameras).

Also, the degree of pixel integration in solid-state imaging devices has been increased to improve the resolution of cameras. Along with this, small and lightweight cameras have been developed by improving the performance of lens optical systems included in the cameras.

In general, a lens optical system of a small camera (e.g., a cellular phone camera) includes many lenses including at least one glass lens for providing a certain degree of performance. However, the manufacturing costs of glass lenses are high, and it is difficult to manufacture a small lens optical system using glass lenses because of limitations in forming/machining processes of the glass lenses. Also, existing lens optical systems used in camera phones generally have an angle of view within a range of about 60° to about 65°.

There is a need for a lens optical system having high performance/high resolution, a relatively wide angle of view, and a small size and light weight as well as features for solving the problems of the glass lenses.

SUMMARY OF THE INVENTION

One or more embodiments of the present invention include a lens optical system that is small and lightweight, and has a relatively wide angle of view and high performance/high resolution.

Additional aspects will be set forth in part in the description which follows and, in part, will be apparent from the description, or may be learned by practice of the presented embodiments.

According to one or more embodiments of the present invention, a lens optical system includes a first lens, a second lens, a third lens, a fourth lens, and a fifth lens sequentially arranged in a direction from an object to an image sensor on which an image of the object is formed, wherein the first lens has a positive (+) refractive power and an entrance surface convex toward the object, the second lens has a negative (−) refractive power and an exit surface concave toward the image sensor, the third lens has a positive (+) refractive power and a meniscus shape convex toward the image sensor, the fourth lens has a negative (−) refractive power and a meniscus shape convex toward the image sensor, the fifth lens has a negative (−) refractive power and at least one of an entrance surface and an exit surface of the fifth lens is an aspheric surface.

The lens optical system may satisfy one or more of Formulas 1 to 4 below:

$$|\tan \theta|/f < 1.0 \qquad \text{<Formula 1>}$$

where θ denotes an angle of view of the lens optical system, and f denotes a focal length of the lens optical system.

$$3.9 < TTL/BFL < 4.3 \qquad \text{<Formula 2>}$$

where TTL is a distance from the entrance surface of the first lens to the image sensor (that is, a total length of the lens optical system), and BFL is a distance from the exit surface of the fifth lens to the image sensor.

$$0.2 < SD/D2 < 1.9 \qquad \text{<Formula 3>}$$

where SD is a distance from an aperture stop to the entrance surface of the first lens, and D2 is a gap between the first lens and the second lens along an optical axis. The distance SD from the aperture stop to the entrance surface of the first lens may be within the range of 0.01<SD<0.3. The gap D2 between the first lens and the second lens along the optical axis may be within the range of 0.05<D2<0.1.

$$1.5 < Nd4 < 1.6 \qquad \text{<Formula 4>}$$

where Nd4 denotes an refractive index of the fourth lens.

The first lens may be a biconvex lens.

An entrance surface of the second lens may be convex toward the object.

At least one selected from the group consisting of the first to fourth lenses may be an aspheric lens.

One or more of an entrance surface and an exit surface of at least one selected from the group consisting of the first to fourth lenses may be aspheric surfaces.

At least one of the entrance surface and the exit surface of the fifth lens may have at least one inflection point between a center portion and an edge thereof.

The entrance surface of the fifth lens may have at least two inflection points between a center portion and an edge thereof.

The center portion of the entrance surface of the fifth lens may be convex toward the object and then may become concave and convex in a direction toward the edge of the entrance surface.

The center portion of the entrance surface of the fifth lens may be convex toward the object and then may become concave, convex, and concave in a direction toward the edge of the entrance surface.

The second, third, fourth, and fifth lenses may be aberration correcting lenses.

The lens optical system may further include an aperture stop disposed between the object and the image sensor.

The aperture stop may be disposed between the object and the first lens.

The lens optical system may further include an infrared blocking element disposed between the object and the image sensor.

The infrared blocking element may be disposed between the fifth lens and the image sensor.

At least one selected from the group consisting of the first to fifth lenses may be a plastic lens.

According to one or more embodiments of the present invention, a lens optical system includes a first lens, a second lens, a third lens, a fourth lens, and a fifth lens sequentially arranged in a direction from an object to an image sensor on which an image of the object is formed, wherein the first lens, the second lens, the third lens, the fourth lens, and the fifth lens have positive (+), negative (−), positive (+), negative (−), and negative (−) refractive powers, respectively, and the lens optical system satisfies one or more of Formulas 1 and 2 below:

$$|\tan \theta|/f < 1.0 \qquad \text{<Formula 1>}$$

where θ denotes an angle of view of the lens optical system, f denotes a focal length of the lens optical system $$3.9 < TTL/BFL < 4.3 \qquad \text{<Formula 2>}$$

where TTL denotes a distance from an entrance surface of the first lens to the image sensor, and BFL denotes a distance from an exit surface of the fifth lens to the image sensor.

In addition, the lens optical system may satisfy Formula 3 below:

$$0.2 < SD/D2 < 1.9 \quad \text{<Formula 3>}$$

where SD is a distance from an aperture stop to the entrance surface of the first lens, and D2 is a gap between the first lens and the second lens along an optical axis.

In addition, the lens optical system may satisfy Formula 4 below:

$$1.5 < Nd4 < 1.6 \quad \text{<Formula>}$$

where Nd4 is a refractive index of the fourth lens.

The first lens may be a biconvex lens.

The second lens may be concave toward the image sensor.

The third lens may be a meniscus lens convex toward the image sensor.

The fourth lens may be a meniscus lens convex toward the image sensor.

The fifth lens may be an aspheric lens. At least one selected of an entrance surface of the fifth lens and the exit surface of the fifth lens may have at least one inflection point between a center portion and an edge thereof. The entrance surface of the fifth lens may have at least two inflection points between a center portion and an edge thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
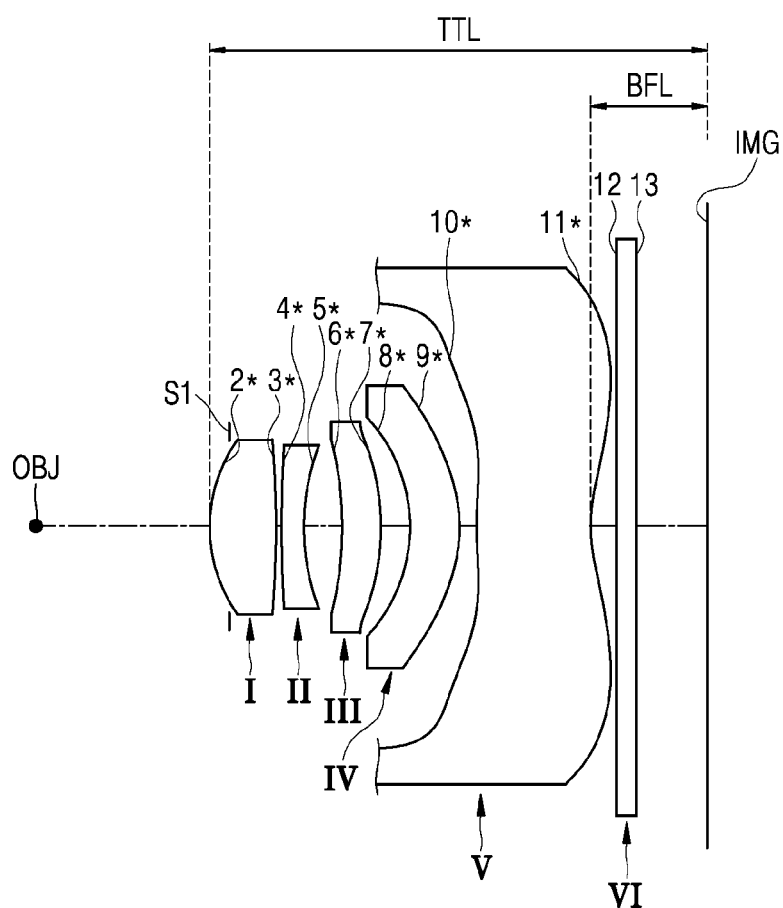
FIGS. 1 to 3 are cross-sectional views illustrating arrangements of main elements of lens optical systems according to first to third embodiments of the present invention.

Reference will now be made in detail to lens optical systems according to exemplary embodiments, examples of which are illustrated in the accompanying drawings, wherein like reference numerals refer to like (or similar) elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
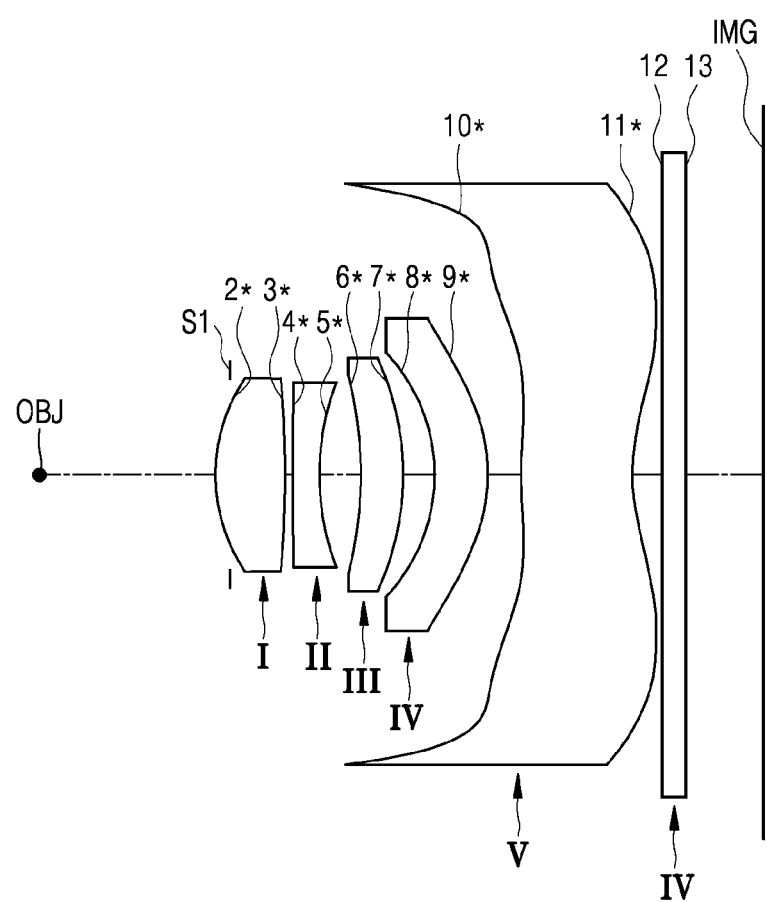
Figure 3:
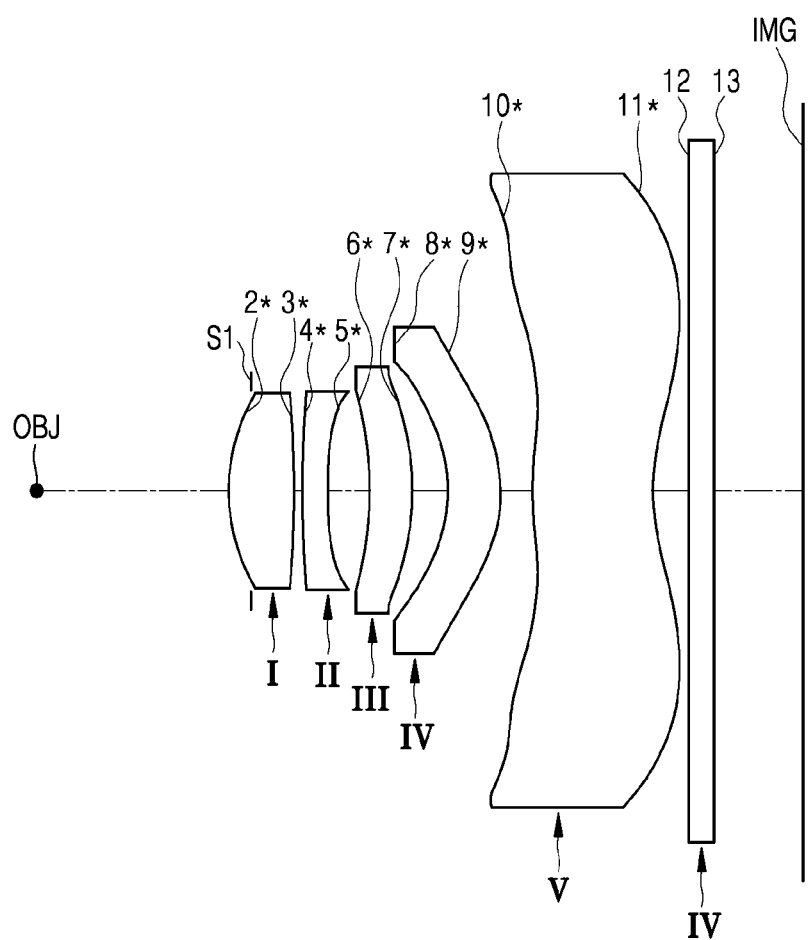

FIGS. 1 to 3 illustrate lens optical systems according to first to third embodiments of the present invention.

Referring to FIGS. 1 to 3, each of the lens optical systems of the embodiments of the present invention includes a first lens I, a second lens II, a third lens III, a fourth lens IV, and a fifth lens V that are sequentially arranged in a direction from an object OBJ toward an image sensor IMG on which an image of the object OBJ is formed. The first lens I may have a positive (+) refractive power and a shape convex toward the object OBJ. An entrance surface 2* of the first lens I may be convex toward the object OBJ, and an exit surface 3* of the first lens I may be convex toward the image sensor IMG. Therefore, both surfaces (i.e., the entrance surface 2* and the exit surface 3*) of the first lens I may be convex. That is, the first lens may be a biconvex lens. The second lens II may have a negative (−) refractive power and a shape concave toward the image sensor IMG. An exit surface 5* of the second lens II may concave toward the image sensor IMG. An entrance surface 4* of the second lens II may be convex toward the object OBJ. Therefore, the second lens II may be a meniscus lens convex toward the object OBJ. The third lens III may be a meniscus lens having a positive (+) refractive power and convex toward the image sensor IMG. Therefore, both surfaces (i.e., an entrance surface 6* and an exit surface 7*) of the third lens III may be convex toward the image sensor IMG. The fourth lens IV may be a meniscus lens having a negative (−) refractive power and convex toward the image sensor IMG. Therefore, both surfaces (i.e., an entrance surface 8* and an exit surface 9*) of the fourth lens IV may be convex toward the image sensor IMG. At least one selected from the group consisting of the first to fourth lenses I to IV may be an aspheric lens. One or both of an entrance surface 2*, 4*, 6*, or 8* and an exit surface 3*, 5*, 7*, or 9* of at least one selected from the group consisting of the first to fourth lenses I to IV may be aspheric surfaces. For example, all the entrance surfaces 2*, 4*, 6*, and 8* and the exit surfaces 3*, 5*, 7*, and 9* of the first to fourth lenses I to IV may be aspheric surfaces.

The fifth lens V may have a negative (−) refractive power, and one or more of an entrance surface 10* and an exit surface 11* of the fifth lens V may be aspheric surfaces. For example, at least one of the entrance surface 10* and the exit surface 11* of the fifth lens V may be an aspheric surface having at least one inflection point between a center portion and an edge thereof. The entrance surface 10* of the fifth lens V may have two or more inflection points between a center portion and an edge thereof. The entrance surface 10* of the fifth lens V may have two inflection points in a direction from the center portion to the edge thereof within an effective lens region (i.e., an effective diameter region) of the fifth lens V. The entrance surface 10* of the fifth lens V may have three inflection points in a direction from the center portion to the edge thereof within the entire region of the fifth lens V. The center portion of the entrance surface 10* of the fifth lens V may be convex toward the object OBJ and then may become concave and convex in a direction toward the edge of the entrance surface 10* within the effective diameter region of the fifth lens V. The center portion of the entrance surface 10* of the fifth lens V may be convex toward the object OBJ and then may become concave, convex, and concave in a direction toward the edge of the entrance surface 10* within the entire region of the fifth lens V. The exit surface 11* of the fifth lens V may have a single inflection point in a direction from a center portion to an edge thereof. The center portion of the exit surface 11* of the fifth lens V may be concave toward the image sensor IMG and then may become convex in a direction toward the edge of the exit surface 11*. The first lens I may have a relatively strong positive (+) refractive power, and the second to fifth lenses II, III, IV, and V may function as aberration correcting lenses.

An aperture stop S1 and an infrared blocking element VI may be disposed between the object OBJ and the image sensor IMG. The aperture stop S1 may be disposed on an object side of the first lens I. In other words, the aperture stop S1 may be adjacent to the entrance surface 2* of the first lens I. The aperture stop S1 may be disposed between the object OBJ and the first lens I. A portion of the first lens I may be disposed within an opening of the aperture stop S1. The infrared blocking element VI may be disposed between the fifth lens V and the image sensor IMG. The infrared blocking element VI may be an infrared blocking filter. The positions of the aperture stop S1 and the infrared blocking element VI may be changed.

Each of the lens optical systems of the embodiments of the present invention may satisfy one or more of Formulas 1 to 4 below.

$$|\tan\theta|/f<1.0 \qquad \text{<Formula 1>}$$

where θ denotes the angle of view of the lens optical system, and f denotes the focal length of the whole lens optical system.

Formula 1 expresses a condition determining the angle of view of the lens optical system. In addition, Formula 1 is related to aberration correction. In Formula 1, if | tan θ|/f is greater than the upper limit value of 1.0, spherical aberration and coma aberration may increase. If Formula 1 is satisfied, spherical aberration and coma aberration may be maintained within acceptable ranges, and also, a relatively wide angle of view, for example, equal to or greater than about 70° may be obtained.

$$3.9<TTL/BFL<4.3 \qquad \text{<Formula 2>}$$

where TTL denotes the distance between the entrance surface 2* of the first lens I and the image sensor IMG (that is, the total length of the lens optical system), and BFL denotes the distance between the exit surface 11* of the fifth lens V and the image sensor IMG. TTL and BLF are lengths measured along an optical axis.

Formula 2 expresses a condition for the lens optical system to have a compact structure. In Formula 2, the more TTL/BFL approaches the upper limit value of 4.3, the more the lens optical system may become compact. Since BFL has a decreasing ratio greater than that of TTL, TTL/BFL may approach the upper limit value of 4.3 as the lens optical system becomes slimmer. However, if TTL/BFL becomes equal to or greater than the upper limit value of 4.3, aberrations such as a spherical aberration may increase. On the other hand, if TTL/BFL becomes equal to or less than the lower limit value of 3.9, aberrations may be effectively corrected. However, the total length of the lens optical system increases, and thus it may be difficult to make the lens optical system with a compact structure. Therefore, TTL/BFL may be maintained within the above-mentioned range to achieve the compactness and aberration correcting ability of the lens optical system.

$$0.2<SD/D2<1.9 \qquad \text{<Formula 3>}$$

In Formula 3, SD denotes the distance between the aperture stop S1 and the entrance surface 2* of the first lens I, and D2 denotes a gap (air gap) between the first lens I and the second lens II along the optical axis of the lens optical system. SD may be a distance measured between the aperture stop S1 and an edge of the entrance surface 2* of the first lens I defined by an effective diameter of the first lens I. In other words, SD may be a distance measured between the aperture stop S1 and an edge of the entrance surface 2* of the first lens I defined by a maximal effective diameter of the first lens I. Namely, SD may be a straight-line distance measured between the aperture stop S1 and the entrance surface 2* of the first lens I in a direction parallel with the optical axis of the lens optical system.

Formula 3 regulates the ratio of the distance SD between an inner end point of the aperture stop S1 and the edge of the entrance surface 2* of the first lens I defined by the maximal effective diameter to the gap D2 between the first and second lenses I and II along the optical axis of the lens optical system. Formula 3 is a condition for adjusting the position of the aperture stop S1 and the gap between the first and second lenses I and II. In the embodiments of the present invention, the aperture stop S1 may be disposed in front of the first lens I at a position close to the first lens I. The distance SD from the aperture stop S1 to the entrance surface 2* of the first lens I may be within the range 0.01<SD<0.3. The gap D2 measured between the first and second lenses I and II along the optical axis may be within the range 0.05<D2<0.1. That is, SD and D2 may respectively satisfy the above-mentioned conditions and may satisfy Formula 3.

$$1.5<Nd4<1.6 \qquad \text{<Formula 4>}$$

where Nd4 denotes the refractive index of the fourth lens IV. Nd4 is measured using the d-line.

Since Formula 4 is a condition regulating the refractive index of the fourth lens IV, Formula 4 is related to a material used to form the fourth lens IV. If the fourth lens IV has a refractive index lower than 1.6, the fourth lens IV may be referred to as a "low-refractive-index lens". If Nd4 satisfies Formula 4, although the fourth lens IV is formed of an inexpensive plastic material, satisfactory properties (such as aberration correcting properties) may easily be obtained.

In the first to third embodiments of the present invention, values related to Formulas 1 to 4 are shown in Tables 1 to 4 below. In Table 1, angles of view are expressed in degrees (°), and in Tables 1 to 3, f, TTL, BFL, SD, and D2 are expressed in millimeters (mm).

TABLE 1

| Embodiments | θ | f | Formula 1 ($|\tan\theta|/f < 1.0$) |
|---|---|---|---|
| First embodiment | 71.00 | 4.76 | 0.65 |
| Second embodiment | 72.02 | 4.67 | 0.05 |
| Third embodiment | 75.71 | 4.37 | 0.07 |

TABLE 2

| Embodiments | TTL | BFL | Formula 2 (3.9 < TTL/BFL < 4.3) |
|---|---|---|---|
| First embodiment | 5.50 | 1.28 | 4.297 |
| Second embodiment | 5.40 | 1.28 | 4.219 |
| Third embodiment | 5.17 | 1.32 | 3.917 |

TABLE 3

| Embodiments | SD | D2 | Formula 3 (0.2 < SD/D2 < 1.9) |
|---|---|---|---|
| First embodiment | 0.083 | 0.08 | 1.038 |
| Second embodiment | 0.143 | 0.08 | 1.788 |
| Third embodiment | 0.021 | 0.08 | 0.263 |

TABLE 4

| Embodiments | Nd4 | Formula 4 (1.5 < Nd4 < 1.6) |
|---|---|---|
| First embodiment | 1.53 | Satisfactory |
| Second embodiment | 1.53 | Satisfactory |
| Third embodiment | 1.53 | Satisfactory |

Referring to Tables 1 to 4, the lens optical systems of the first to third embodiments satisfy Formulas 1 to 4.

In the lens optical systems of the embodiments of the present invention, the first to fifth lenses I to V may be formed of a plastic material in consideration of the shapes and dimensions thereof. That is, all the first to fifth lenses I to V may be plastic lenses. The manufacturing costs of glass lenses are high, and it is difficult to manufacturing small lens optical systems using glass lenses because of limitations in forming/machining processes of glass lenses. In the embodiments of the present invention, however, all first to fifth lenses I to V may be formed of plastic material, and thus various effects (advantages) may be obtained. However, materials that may be used to form the first to fifth lenses I to V are not limited to a plastic material. If necessary, one or more of the first to fourth lenses I to IV may be formed of glass.

Hereinafter, the first to third embodiments of the present invention will be described in more detail with reference to lens data and the accompanying drawings.

Tables 5 to 7 below show data such as the radii of curvature, thicknesses or intervals, refractive indexes, and Abbe numbers of the lenses of the lens optical systems shown in FIGS. 1 to 3. In Tables 5 to 7, R denotes a radius of curvature, D denotes a thickness of a lens, an interval between lenses, or an interval between adjacent elements, Nd denotes a refractive index of a lens measured using the d-line, and Vd denotes an Abbe number of a lens with respect to the d-line. If "*" is attached to the surface number of a surface, the surface is aspheric. R and D are expressed in millimeters (mm).

TABLE 5

| First embodiment | Surfaces | R | D | Nd | Vd |
|---|---|---|---|---|---|
| | S1 | — | — | | |
| I | 2* | 1.6119 | 0.7265 | 1.533 | 55.86 |
| | 3* | −90.1681 | 0.0800 | | |
| II | 4* | 500.0000 | 0.2383 | 1.647 | 22.43 |
| | 5* | 3.9064 | 0.4284 | | |
| III | 6* | −7.1744 | 0.4147 | 1.533 | 55.86 |
| | 7* | −3.3182 | 0.3218 | | |
| IV | 8* | −1.4941 | 0.5489 | 1.533 | 55.86 |
| | 9* | −1.7085 | 0.1920 | | |
| V | 10* | 5.7660 | 1.2694 | 1.533 | 55.86 |
| | 11* | 2.1235 | 0.2800 | | |
| VI | 12 | Infinity | 0.2100 | | |
| | 13 | Infinity | 0.8005 | | |
| | IMG | Infinity | | | |

TABLE 6

| Second embodiment | Surfaces | R | D | Nd | Vd |
|---|---|---|---|---|---|
| | S1 | — | — | | |
| I | 2* | 1.6195 | 0.6844 | 1.533 | 55.86 |
| | 3* | −50.9751 | 0.0800 | | |

TABLE 6-continued

| Second embodiment | Surfaces | R | D | Nd | Vd |
|---|---|---|---|---|---|
| II | 4* | 500.0000 | 0.2602 | 1.647 | 22.43 |
| | 5* | 3.6812 | 0.4151 | | |
| III | 6* | −7.2175 | 0.4200 | 1.533 | 55.86 |
| | 7* | −3.1221 | 0.3033 | | |
| IV | 8* | −1.4458 | 0.5247 | 1.533 | 55.86 |
| | 9* | −1.6372 | 0.3323 | | |
| V | 10* | 4.5111 | 1.1000 | 1.533 | 55.86 |
| | 11* | 1.8652 | 0.2800 | | |
| VI | 12 | Infinity | 0.2100 | | |
| | 13 | Infinity | 0.8013 | | |
| | IMG | Infinity | | | |

TABLE 7

| Third embodiment | Surfaces | R | D | Nd | Vd |
|---|---|---|---|---|---|
| | S1 | — | — | | |
| I | 2* | 1.5780 | 0.5966 | 1.533 | 55.86 |
| | 3* | −27.0883 | 0.0800 | | |
| II | 4* | 131.4495 | 0.2200 | 1.647 | 22.43 |
| | 5* | 3.3111 | 0.3803 | | |
| III | 6* | −7.7216 | 0.3838 | 1.533 | 55.86 |
| | 7* | −3.1876 | 0.3323 | | |
| IV | 8* | −1.2240 | 0.4738 | 1.533 | 55.86 |
| | 9* | −1.3953 | 0.2935 | | |
| V | 10* | 3.4102 | 1.0897 | 1.533 | 55.86 |
| | 11* | 1.7737 | 0.3200 | | |
| VI | 12 | Infinity | 0.2100 | | |
| | 13 | Infinity | 0.8047 | | |
| | IMG | Infinity | | | |

Each of the aspheric surfaces of the lenses of the lens optical systems of the first to third embodiments of the present invention satisfies Formula 5 below (aspheric surface equation):

$$x = \frac{c'y^2}{1+\sqrt{1-(K+1)c'^2 y^2}} + Ay^4 + By^6 + Cy^8 + Dy^{10} + Ey^{12} \quad \langle \text{Formula 5} \rangle$$

where x denotes a distance measured from the vertex of a lens in the direction of the optical axis of the lens, y denotes a distance measured from the optical axis in a direction perpendicular to the optical axis, c' denotes a reciprocal number (1/R) of the radius of curvature at the vertex of the lens, K denotes a conic constant, and A, B, C, D, and E denote aspheric surface coefficients.

Tables 8 to 10 below show aspheric surface coefficients of the lens optical systems of the first to third embodiments shown in FIGS. 1 to 3. That is, Tables 8 to 10 show the aspheric surface coefficients of the entrance surfaces 2*, 4*, 6*, 8*, and 10*, and the exit surfaces 3*, 5*, 7*, 9*, and 11* of the lenses of Tables 5 to 7.

TABLE 8

| Surfaces | K | A | B | C | D | E |
|---|---|---|---|---|---|---|
| 2* | −0.1474 | 0.0039 | −0.0005 | −0.0213 | 0.0304 | −0.0260 |
| 3* | 0.0000 | −0.0315 | 0.0311 | −0.0438 | −0.0117 | 0.0102 |
| 4* | 0.0000 | −0.0148 | 0.0827 | −0.0509 | −0.0045 | 0.0166 |
| 5* | 4.4792 | 0.0046 | 0.0769 | −0.0136 | 0.0033 | 0.0348 |
| 6* | 0.0000 | −0.1028 | −0.0071 | 0.0102 | 0.0192 | 0.0231 |
| 7* | 0.0000 | −0.0356 | −0.0338 | 0.0291 | 0.0026 | 0.0023 |
| 8* | −5.7294 | −0.0414 | 0.0089 | −0.0207 | 0.0058 | −0.0002 |
| 9* | −1.5197 | 0.0109 | −0.0107 | 0.0090 | −0.0035 | 0.0004 |

TABLE 8-continued

| Surfaces | K | A | B | C | D | E |
|---|---|---|---|---|---|---|
| 10* | −66.7289 | −0.1011 | 0.0226 | −0.0008 | −0.0001 | −0.0000 |
| 11* | −6.5857 | −0.0460 | 0.0124 | −0.0028 | 0.0003 | −0.0000 |

TABLE 9

| Surfaces | K | A | B | C | D | E |
|---|---|---|---|---|---|---|
| 2* | −0.1586 | 0.005 | −0.0051 | −0.0191 | 0.0335 | −0.0342 |
| 3* | 0.0000 | −0.0322 | 0.0300 | −0.0477 | −0.0134 | 0.0079 |
| 4* | 0.0000 | −0.0169 | 0.0836 | −0.0531 | −0.0104 | 0.0171 |
| 5* | 4.0051 | 0.0026 | −0.0749 | −0.0100 | 0.0082 | 0.0212 |
| 6* | 0.0000 | −0.1048 | −0.0095 | 0.00999 | 0.0192 | 0.0267 |
| 7* | 0.0000 | −0.0350 | −0.0395 | 0.0276 | 0.0036 | 0.0028 |
| 8* | −5.2173 | −0.0521 | 0.0119 | −0.0177 | 0.0062 | −0.0005 |
| 9* | −1.4296 | 0.0100 | −0.0092 | 0.0097 | −0.0033 | 0.0004 |
| 10* | −36.8898 | −0.1019 | 0.0225 | −0.0009 | −0.0001 | −0.0000 |
| 11* | −6.2317 | −0.0487 | 0.0128 | −0.0028 | 0.0003 | −0.0000 |

TABLE 10

| Surfaces | K | A | B | C | D | E |
|---|---|---|---|---|---|---|
| 2* | −0.1801 | 0.0056 | −0.0132 | −0.0234 | 0.0499 | −0.0670 |
| 3* | 0.0000 | −0.0253 | 0.0310 | −0.010 | −0.0158 | 0.0089 |
| 4* | 0.0000 | −0.0049 | 0.0977 | −0.0538 | −0.0391 | 0.0421 |
| 5* | 3.8056 | −0.0025 | 0.0932 | −0.0212 | 0.0213 | 0.0213 |
| 6* | 0.0000 | −0.1181 | −0.0232 | 0.0080 | 0.0172 | 0.0694 |
| 7* | 0.0000 | −0.0448 | −0.0465 | 0.0266 | 0.0112 | 0.0111 |
| 8* | −4.2241 | −0.0735 | 0.0228 | −0.0098 | 0.0082 | −0.0005 |
| 9* | −1.1835 | 0.0085 | −0.0034 | 0.0145 | −0.0023 | −0.0004 |
| 10* | −25.6981 | −0.0987 | 0.0230 | −0.0010 | −0.0001 | −0.0000 |
| 11* | −6.4380 | −0.0465 | 0.0114 | −0.0025 | 0.0003 | −0.0000 |

Figure 4:
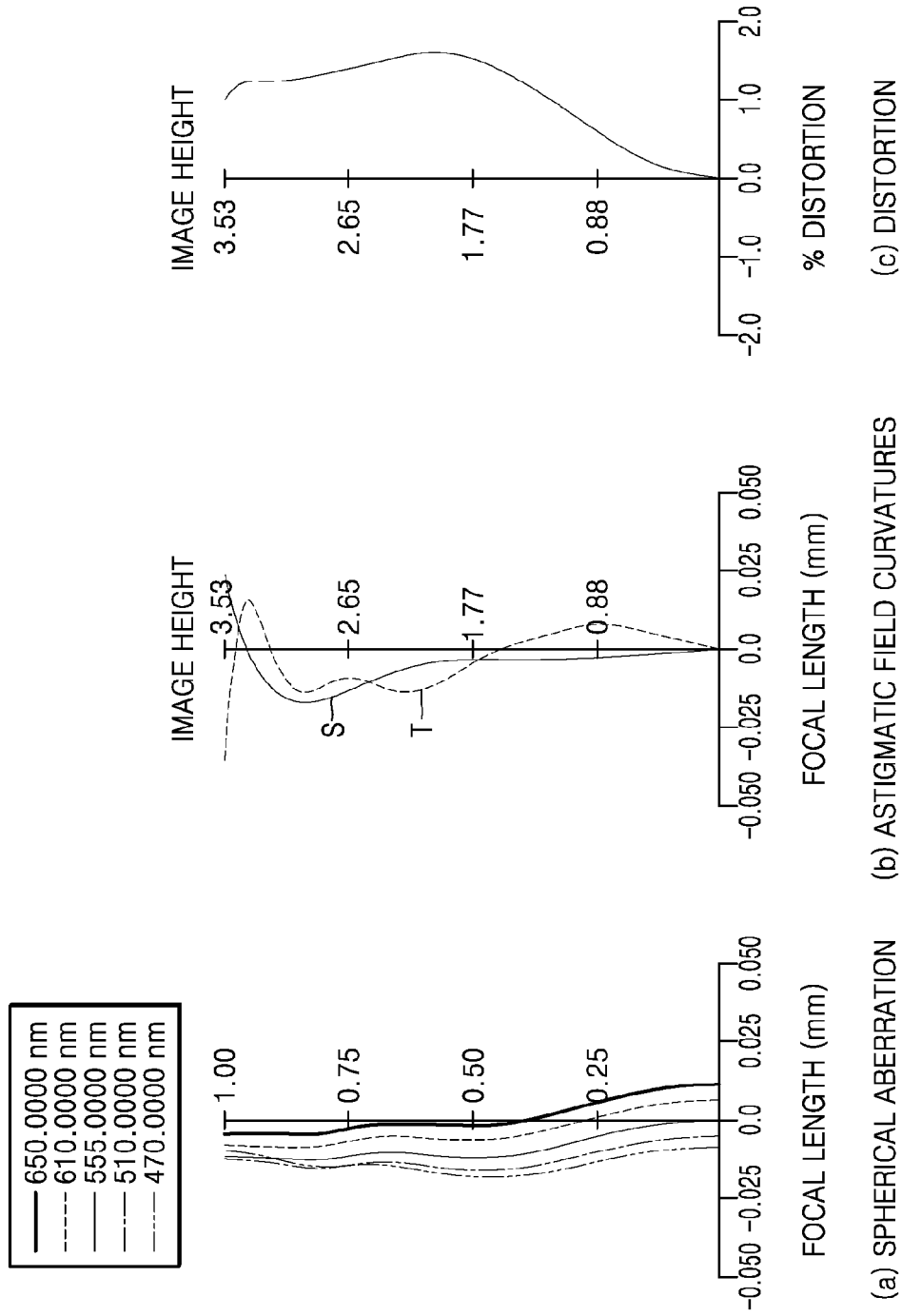
FIG. 4 illustrates a longitudinal spherical aberration, astigmatic field curvatures, and distortion of the lens optical system of the first embodiment of the present invention.

FIG. 4 illustrates a longitudinal spherical aberration, astigmatic field curvatures, and distortion of the lens optical system of the first embodiment (shown in FIG. 1) having the data shown in Table 5.

In FIG. 4, the graph (a) shows the spherical aberration of the lens optical system with respect to light having various wavelengths, and the graph (b) shows the astigmatic field curvatures of the lens optical system including a tangential field curvature T and a sagittal field curvature S. Data of the graph (a) were obtained using light having wavelengths of 650.0000 nm, 610.0000 nm, 555.0000 nm, 510.0000 nm, and 470.0000 nm. Data of the graphs (b) and (c) were obtained using light having a wavelength of 555.000 nm. Graphs of FIGS. 5 and 6 were obtained in the same manner.

Figure 5:
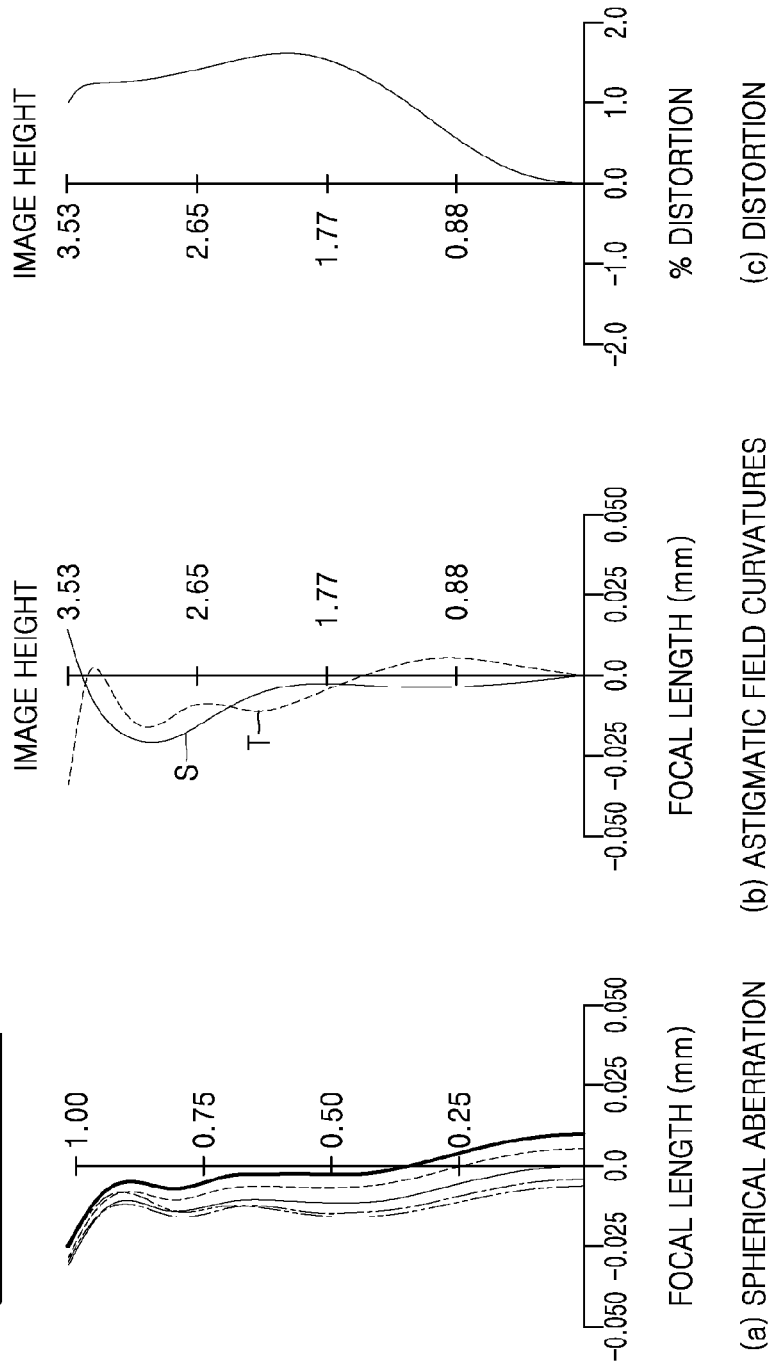
FIG. 5 illustrates a longitudinal spherical aberration, astigmatic field curvatures, and distortion of the lens optical system of the second embodiment of the present invention.

The graphs (a), (b), and (c) of FIG. 5 illustrate longitudinal spherical aberration, astigmatic field curvatures, and distortion of the lens optical system of the second embodiment (shown in FIG. 2) having the data shown in Table 6.

Figure 6:
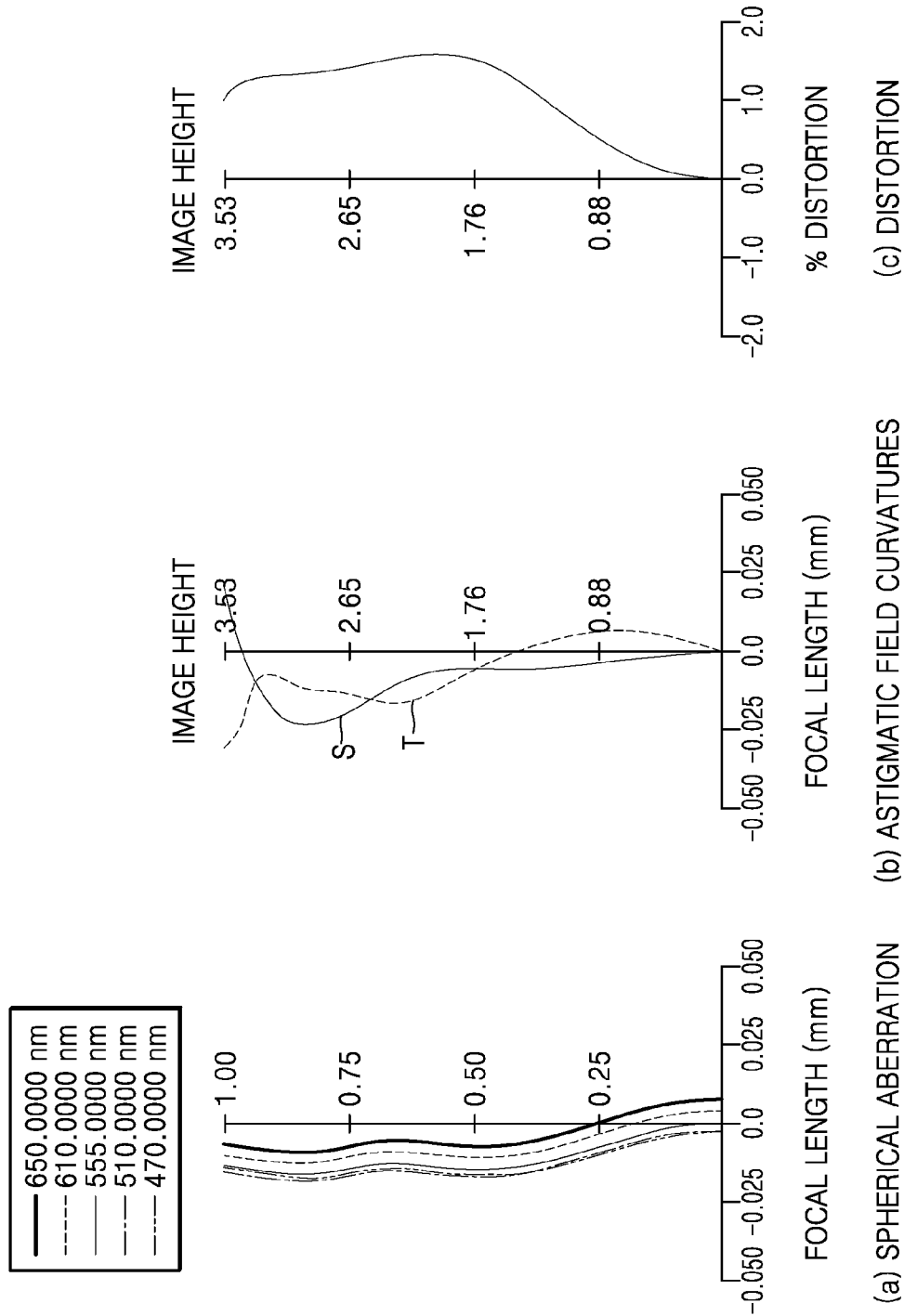
FIG. 6 illustrates a longitudinal spherical aberration, astigmatic field curvatures, and distortion of the lens optical system of the third embodiment of the present invention.

The graphs (a), (b), and (c) of FIG. 6 illustrate longitudinal spherical aberration, astigmatic field curvatures, and distortion of the lens optical system of the third embodiment (shown in FIG. 3) having the data shown in Table 7.

As described above, each of the lens optical systems of the embodiments of the present invention includes the first to fifth lenses I to V sequentially arranged from the object side OBJ to the image sensor IMG and having positive (+), negative (−), positive (+), negative (−), and negative (−) refractive powers. Each of the lens optical systems may satisfy one or more of Formulas 1 to 4. The lens optical systems may have relatively wide angles of view and relatively short total lengths, and various aberrations thereof may easily (effectively) be corrected. That is, according to the embodiments of the present invention, lens optical systems having small sizes and relatively wide angles of view but providing high performance and high resolution may be provided.

Particularly, in the lens optical systems of the embodiments of the present invention, if at least one of the entrance surface 10* and the exit surface 11* of the fifth lens V is an aspheric surface having at least one inflection point in a direction from a center portion to an edge thereof, specifically, if the entrance surface 10* is an aspheric surface having at least two inflection points in a direction from a center portion to an edge thereof, various aberrations may easily be corrected by using the fifth lens V, and the exit angle of chief rays may be decreased to prevent vignetting.

In addition, if the first to fifth lenses I to V are formed of plastic material and both surfaces (entrance surface and exit surface) of each of the first to fifth lenses I to V are aspheric surfaces, the lens optical systems may have compact structures and high performance and may be manufactured with lower costs, compared to lens optical systems including glass lenses.

It should be understood that the exemplary embodiments described herein should be considered in a descriptive sense only and not for purposes of limitation. Descriptions of features or aspects within each embodiment should typically be considered as available for other similar features or aspects in other embodiments. For example, those of ordinary skill in the art may use a blocking film as the infrared blocking element VI instead of using a filter. While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A lens optical system comprising a first lens, a second lens, a third lens, a fourth lens, and a fifth lens sequentially arranged in a direction from an object to an image sensor on which an image of the object is formed,
   wherein the first lens has a positive (+) refractive power and an entrance surface convex toward the object,
   the second lens has a negative (−) refractive power and an exit surface concave toward the image sensor,
   the third lens has a positive (+) refractive power and a meniscus shape convex toward the image sensor,
   the fourth lens has a negative (−) refractive power and a meniscus shape convex toward the image sensor,
   the fifth lens has a negative (−) refractive power and at least one of an entrance surface and an exit surface of the fifth lens is an aspheric surface, and the entrance surface of the fifth lens has at least two inflection points between a center portion and an edge thereof, and
   the lens optical system satisfies the following formula:

$$|\tan \theta|/f < 1.0 \qquad \text{<Formula>}$$

where θ denotes an angle of view of the lens optical system, and f denotes a focal length of the lens optical system.

2. The lens optical system of claim 1, wherein a distance TTL from the entrance surface of the first lens to the image sensor and a distance BFL from the exit surface of the fifth lens to the image sensor satisfy the following formula:

$$3.9 < TTL/BFL < 4.3. \qquad \text{<Formula>}$$

3. The lens optical system of claim 1, further comprising an aperture stop adjacent to the entrance surface of the first lens,
wherein a distance SD from the aperture stop to the entrance surface of the first lens and a gap D2 between the first lens and the second lens along an optical axis satisfy the following formula:

$$0.2 < SD/D2 < 1.9.$$ <Formula>

4. The lens optical system of claim 1, wherein the fourth lens has a refractive index Nd4 satisfying the following formula:

$$1.5 < Nd4 < 1.6.$$ <Formula>

5. The lens optical system of claim 1, wherein the first lens is a biconvex lens.

6. The lens optical system of claim 1, wherein an entrance surface of the second lens is convex toward the object.

7. The lens optical system of claim 1, wherein at least one selected from the group consisting of the first to fourth lenses is an aspheric lens.

8. The lens optical system of claim 1, wherein the center portion of the entrance surface of the fifth lens is convex toward the object and then becomes concave and convex in a direction toward the edge of the entrance surface.

9. The lens optical system of claim 1, wherein the center portion of the entrance surface of the fifth lens is convex toward the object and then becomes concave, convex, and concave in a direction toward the edge of the entrance surface.

10. The lens optical system of claim 1, further comprising an aperture stop disposed between the object and the first lens.

11. The lens optical system of claim 1, further comprising an infrared blocking element disposed between the fifth lens and the image sensor.

12. The lens optical system of claim 1, wherein at least one selected from the group consisting of the first to fifth lenses is a plastic lens.

13. A lens optical system comprising a first lens, a second lens, a third lens, a fourth lens, and a fifth lens sequentially arranged in a direction from an object to an image sensor on which an image of the object is formed,
wherein the first lens, the second lens, the third lens, the fourth lens, and the fifth lens have positive (+), negative (−), positive (+), negative (−), and negative (−) refractive powers, respectively,
wherein the third lens is a meniscus lens convex toward the image sensor,
wherein the entrance surface of the fifth lens has at least two inflection points between a center portion and an edge thereof, and
the lens optical system satisfies the following formulas:

$$|\tan \theta|/f < 1.0$$ Formula $$3.9 < TTL/BFL < 4.3$$ Formula wherein θ denotes an angle of view of the lens optical system, f denotes a focal length of the lens optical system, TTL denotes a distance from an entrance surface of the first lens to the image sensor, and BFL denotes a distance from an exit surface of the fifth lens to the image sensor.

14. The lens optical system of claim 13, further comprising an aperture stop adjacent to the entrance surface of the first lens,
wherein a distance SD from the aperture stop to the entrance surface of the first lens and a gap D2 between the first lens and the second lens along an optical axis satisfy the following formula:

$$0.2 < SD/D2 < 1.9.$$ <Formula>

15. The lens optical system of claim 13, wherein the fourth lens has a refractive index Nd4 satisfying the following formula:

$$1.5 < Nd4 < 1.6.$$ <Formula>

16. The lens optical system of claim 13, wherein
the first lens has a biconvex shape,
the second lens is concave toward the image sensor,
the fourth lens is a meniscus lens convex toward the image sensor, and
the fifth lens is an aspheric lens.

* * * * *